United States Patent Office 3,560,149
Patented Feb. 2, 1971

3,560,149
PROCESS FOR TREATING PHOSPHATE ROCK
Joseph W. Markey and Ernest C. Camp, Jr., College Park, Ga., assignors to Cities Service Company, a corporation of Delaware
Filed Apr. 29, 1968, Ser. No. 725,017
Int. Cl. C01b 25/18
U.S. Cl. 23—165                 11 Claims

ABSTRACT OF THE DISCLOSURE

Phosphoric acid can be prepared from phosphate rock by acidulating the rock from about 75–85% by weight nitric acid to form an acidulate and thereafter precipitating anhydrous calcium nitrate by raising the nitric acid content of the acidulate. The precipitated anhydrous calcium nitrate can be decomposed in the presence of a nitrogen oxide containing atmosphere and the product gases can be used to form nitric acid which can be recycled to the acidulation or anhydrous calcium nitrate precipitation steps. The decomposition gases can also be recycled directly to form nitric acid in situ.

By decomposing the precipitated calcium nitrate in the presence of a nitrogen oxide-containing atmosphere, a product gas stream containing a high proportion of nitrogen and a relatively low proportion of undesired inerts may be obtained. The calcium nitrate may be decomposed in the presence of a bed of fluidized solids. The bed may comprise by-product lime that is heated and recycled to the decomposition zone. A portion of the product gas may be recycled to the decomposition zone at a bed fluidizing velocity. The product gases, comprising nitrogen oxides and oxygen, are particularly suitable for use in the formation of concentrated nitric acid. This acid may conveniently be recycled to the acidulation or anhydrous calcium nitrate separation operations. The product gases may also advantageously be recycled directly to the acidulation mixture so as to form nitric acid in situ.

BACKGROUND OF THE INVENTION

This invention relates to a process for producing a phosphoric acid solution from phosphate rock. In particular, it relates to an improved process for producing phosphoric acid by nitric acid acidulation.

Many techniques have been considered for the production of phosphoric acid or a phosphatic concentrate from phosphate rock. Most notable among such techniques is the so-called wet process employing sulfuric acid to digest the rock. This technique is the most widely used in industry to date. A process involving the use of nitric acid for acidulation has also been investigated and is used to a limited extent commercially. Recently the demand for sulfur has far exceeded the dwindling supplies so that other methods such as the nitric acid method are of increasing importance. Thus, it is desirable to achieve a process, not involving sulfuric acid, that will be as economical and also overcome some of its inherent disadvantages.

As is well known, the production of phosphoric acid is highly desirable to the fertilizer industry since it is readily utilizable, by neutralization with various bases, to produce mixed fertilizers of high plant food analysis. Even with the long-standing experience of the commercial sulfuric acid and nitric acid processes, deficiencies still exist and it is highly desirable to be able to more efficiently produce a phosphoric acid solution which will more readily form fertilizing materials exhibiting greater water solubility and plant food analysis than heretofore obtainable by practical means.

Previous attempts at processing phosphate rock with nitric acid have left much to be desired in meeting the requirements of the fertilizer industry. By way of specific but illustrative example, the prior nitric acid acidulation processes have involved digesting phosphate rock with low concentrations of nitric acid which, while producing marketable yields of phosphoric acid solution, still leave excessive calicum in the system and require uneconomical processing equipment and techniques. Further, previously known processes have resulted in excessive quantities of water insoluble calcium phosphates thereby decreasing the yield of phosphoric acid or usable phosphorous values for fertilizer purposes. Additionally, previous processes have produced calcium nitrate by-product in the less desirable hydrated form. The prior art has used various means for removing the calcium nitrate from the acidulate such as refrigeration or the addition of various salts. However, no practical and economical method for removing adequate quantities of the calcium nitrate from the system has been found producing a phosphoric acid solution which, upon neutralization, results in a highly water soluble fertilizer.

Various efforts have also been made to thermally decompose calcium nitrate to form lime and nitrogen oxides that can be converted into additional nitric acid. The nitric acid formed in this manner can be recycled for the acidulation of additional phosphate rock. Commercial utilization of such a process has, however, been deterred in part by the large quantity of heat that must be supplied in order to effect decomposition of the calcium nitrate. In addition, various operating difficulties have also adversely affected the prospects for commercialization of this process.

The by-product calcium nitrate is commonly obtained in the form of calcium nitrate tetrahydrate, although a lower hydrate may be produced depending upon the operating conditions employed. Three phases normally exist during thermal decomposition. The solid phase comprises calcium nitrate and the lime resulting from decomposition of a portion of the calcium nitrate. A gas phase comprising nitrogen oxides, i.e., NO and $NO_2$, is formed. The liquid phase comprising calcium nitrate melt is caused by the phase change, or melting, that occurs below the decomposition temperature.

Because of the presence of the liquid phase resulting from the melt of calcium nitrate, stickiness and agglomeration of the calcium solids results. In addition, the liquid phase tends to trap lime particles resulting in the caking of the lime on the walls of the decomposition vessel. This caking prevents or reduces proper heat exchange and also tends to hinder the evolution of the nitrogen oxides formed during decomposition. In order to overcome these operating difficulties, it has been heretofore proposed that an aqueous solution of calcium nitrate be sprayed on a recycle bed of calcium oxide in an externally-heated rotary kiln. The mixture of lime and calcium nitrate in the kiln, therefore, ordinarily will contain from about 60% to about 90% by weight of lime. For this purpose, residual lime discharged from the kiln is recycled back into the kiln feed. By maintaining this high portion of lime in the kiln, it is possible to reduce the stickiness of the material and the resultant caking of the solids on the wall of the kiln. Better solids and gas flow through the kiln result. The very high ratio of lime to calcium nitrate, however, results in a significant decrease in the actual available capacity of the kiln. The equipment needs to carry out such a process is, therefore, economically excessive.

It has also been proposed that the calcium nitrate be decomposed in the presence of steam in order to recover the nitrogen values from the calcium nitrate in the form of nitric acid vapors that can be condensed for the recovery of nitric acid in its liquid form. Such a process is shown in the Nossen patent, U.S. 2,737,445. The calcium nitrate decomposes and liberates nitric acid anhydride, $N_2O_5$, which is unstable and tends to combine with the steam to form nitric acid vapors. This anhydride is caused to react with steam before it breaks down into lower nitrogen oxides, and the nitric acid must be rapidly removed from the decomposition zone in order to protect the nitric acid against splitting. Such a process is limited, however, to the production of relatively dilute nitric acid solutions because of the excess of steam that must be employed and is subject to a relatively high cooling requirement in reconstituting the decomposition vapors as aqueous nitric acid.

Accordingly, there exists an urgent need for a simple, direct and economical method for processing phosphate rock into a phosphatic concentrate capable of forming a highly water soluble fertilizer upon further processing, free of the side effects and deficiencies of the prior art.

SUMMARY OF THE INVENTION

It is a primary object of this invention to provide an improved process for producing phosphoric acid, especially phosphoric acid solutions or phosphatic concentrates, from phosphate rock.

It is another object to provide an improved process for producing phosphoric acid solutions by the nitric acid acidulation of phosphate rock.

It is a still further object to provide an improved process for directly producing a phosphoric acid solution which, upon the usual processing such as neutralization, results in a more water soluble mixed fertilizer having a higher plant food analysis.

In addition it is an object to provide a process for producing a more valuable phosphoric acid solution and valuable anhydrous calcium nitrate by-product by the nitric acid acidulation of phosphate rock.

It is another object of the present invention to provide a nitric acid acidulation process having improved means for the recovery of the nitrogen values from the by-product calcium nitrate produced by the acidulation process.

It is another object of the present invention to provide an improved calcium nitrate decomposition process.

It is a further object of the present invention to provide a process for the decomposition of calcium nitrate in which the recovery of the nitrogen values therefrom is maximized.

It is a further object of the present invention to provide a calcium nitrate decomposition process in which the nitrogen is recovered principally in the form of nitric oxide and nitrogen dioxide.

It is a further object of the present invention to provide an improved process for the manufacture of nitric acid by thermal decomposition of calcium nitrate.

It is a further object of the present invention to provide a means for manufacturing high concentration nitric acid by the thermal decomposition of calcium nitrate.

Other aspects, objects and advantages of this invention will be evident as the discussion proceeds.

The above and other objects of this invention are achieved by digesting phosphate rock with at least sufficient 75 to 85% by weight concentrated nitric acid to convert the phosphate rock to an acidulate comprising phosphoric acid and calcium nitrate, in solution, and thereafter precipitating anhydrous calcium nitrate from the acidulate.

During the digestion, it is particularly advantageous to employ about an 80% by weight nitric acid concentration. The temperature of the digestion reaction is preferably the equilibrium temperature normally achieved by the reaction of the nitric acid with the phosphate rock. For best results, the rock should be pre-crushed to a particle size so that it will pass through a 30 Tyler mesh screen.

Subsequent to digesting the phosphate rock as aforedescribed, the calcium nitrate is precipitated from the resulting acidulate in its anhydrous form. This step is best, and preferably, performed by increasing the nitric acid content of the acidulate. The increase in the nitric acid content of the acidulate can be achieved either by adding a more concentrated nitric acid solution to the acidulate or, preferably, by forming nitric acid in situ, for example by introducing a nitrogen oxide and oxygen into the resulting acidulate, preferably under pressure. During the precipitation step, the temperature employed is preferably that achieved by the precipitation reaction mix.

The increase in nitric acid concentration should also be such that, upon precipitation of the calcium nitrate, no more than about 14% by weight of water remains in the resulting supernatant solution.

The supernatant liquid is recovered by conventional means. If desired, the phosphoric acid can be recovered from the supernatant liquid as superphosphoric acid or the supernatant liquid can be employed, if necessary after removal of undesired excess nitric acid, to directly produce mixed fertilizers of high water solubility and high plant food analysis by conventional means.

By the unique two-step process briefly described above and more elaborately presented hereinafter, many advantageous results are achieved. By way of example, a phosphoric acid solution (phosphatic concentrate) is produced which, when converted to a fertilizer mix, is at least 90% and generally at least 95% soluble in water, a feature which has not been readily achievable by the prior art process. Another feature of the invention is that both steps can be conducted at equilibrium temperature condition, thus simplifying the economics and obviating the need for complex equipment and processing employed heretofore. For example, there is no need to employ refrigerating equipment or the addition of salts or the like such as used in present nitric acid acidulation processes. Another advantage is that, rather than having to employ high grade phosphate rock as presently required, low grade phosphate rock can be employed while still producing a product from which a high analysis is mixed fertilizer having a greater water solubility can be produced. Still further, complications normally attendant by gangue formation in the prior art process are minimized and in many cases obviated. An even further advantage of the invention is that anhydrous calcium nitrate is produced and recovered rather than the hydrated calcium nitrate as is produced by the prior art techniques. The anhydrous calcium nitrate produced by the present invention is of such a high yield, readily at least 90% and most generally over 95%, and of such a high purity that it can be used as obtained; for example, for low quality fertilizer purposes, for decomposition to produce nitrogen oxides which are, in turn, useful for production of nitric acid, or other well known uses of calcium nitrate. These and other advantages of the novel process will be apparent as the discussion proceeds.

The precipiated calcium nitrate is decomposed in a nitrogen oxide-rich atmosphere. The nitrogen values of the calcium nitrate, which are produced in the form of nitrogen oxides, can thus be recovered in a product gas stream containing a relatively high proportion of nitrogen oxides. Conversely, the product gas stream will contain a very low percentage of inert material. By also maintaining the ratio of water to nitrogen oxides as low as possible, a product gas stream particularly well suited for the production of very concentrated nitric acid is obtained.

The calcium nitrate to be decomposed may be injected into a decomposition zone in either solid or liquid form. In one embodiment, the calcium nitrate is injected in the form of a mist or spray of atomized droplets. In another embodiment, the objects of the present invention are accomplished by decomposing calcium nitrate in a fluidized bed decomposition zone. Fluidization may be achieved by recycling a portion of the gaseous product of the decomposition zone upwardly through the decomposition zone at a bed fluidizing velocity. The heat necessary for decomposition may be supplied by heating the fluidizing gas or the solid particles introduced into the decomposition zone to form and maintain the solids bed.

The solids bed may be maintained by recycling a portion of the byproduct lime withdrawn from the bed. The recycled lime may be heated to above the decomposition temperature of the calcium nitrate in a regeneration zone prior to being introduced into the decomposition zone. During their retention in the decomposition zone, the particles of by-product lime tend to grow due to agglomeration and the deposition of newly formed lime on the surface of the existing particles. Thus, the fluidized bed system results in an advantageous growth in the particle size of the lime product. In the decomposition of calcium nitrate under relatively static conditions, as in a rotary kiln, growth is undesired and leads to a build-up of lime in the reactor. Under relatively static conditions, the evolution of gaseous products from the calcium nitrate results in the formation of extremely finely divided calcium oxide particles. The separation of these particles from the decomposition gases constitutes a difficult, but necessary, operation if the product gases are to be used in the manufacture of nitric acid. The larger sized particles of lime formed by means of the fluidized operation of the present invention, on the other hand, permits the obtaining of a product gas stream essentially free of calcium oxide fines.

Continued growth of the recycled lime particles, however, would ultimately result in the particles having a particle size too large for satisfactory fluidization. In the heating of the portion of the by-product lime to be recycled, however, a breakdown in particle size results. Consequently, the lime particles recycled to the decomposition zone following heating in the regeneration zone are of a particle size particularly well suited for the fluidization process of the present invention.

The nitrogen values from the decomposed calcium nitrate are withdrawn from the decomposition zone principally in the form of nitric oxide and nitrogen dioxide. A portion of the product gas stream may be recycled to provide the fluidizing gas employed in the decomposition zone. The remainder of the product stream may be absorbed in water to form nitric acid. In the production of nitric acid in this manner, fines comprising very small particles of lime must be removed from the product gas stream. Since the separation of the fines from the product gas stream constitutes a difficult operation, it is desirable that the amount of fines carried over in the product gas stream be minimized. In the fluidized operation of the present invention, it has been found that the particles of lime tend to grow in size during their retention in the decomposition zone. The growth of the particles correspondingly reduces the amount of fines and thus minimizes the quantity of fines in the product gas stream.

When the production of very concentrated nitric acid from the product gas stream is desired, it is preferable that the partial pressure of nitrogen oxides in the product gas stream be held as high as possible and that the ratio of water to nitrogen oxides be as low as possible. The introduction of water or inerts, such as nitrogen, advantageously should be restricted or avoided. For this reason, it is desirable that the calcium nitrate be fed to the decomposition zone either as the anhydrous crystalline solid, as a melt of the anhydrous salt, or as a highly concentrated aqueous solution of the salt. In addition, any water or nitric acid introduced into the decomposition zone requires utilization of additional heat to decompose the nitric acid and to raise the temperature of the water and decomposition products to the decomposition temperature. The cooling requirements upon reconstituting this material as aqueous nitric acid are correspondingly increased.

In the embodiment of the present invention in which the portion of the product gas is recycled to the decomposition zone, the introduction of water or inert gases into the system is thus avoided. This embodiment is, therefore, particularly useful when a very concentrated nitric acid is to be produced from the product gas stream.

The solids withdrawn from the decomposition zone may entrap and carry-over nitrogen oxide gases produced in the decomposition zone. In order to recover these nitrogen values, the solids withdrawn from the decomposition zone may be purged with a gas that is fed back into the decomposition chamber. While any inert gas may be employed, an oxygen-rich gas serves not only to recover the nitrogen values in question from the by-product solids stream, but also tends to assure that the product gas stream comprises essentially nitric oxide, nitrogen dioxide, and excess oxygen. With this product gas stream, very concentrated nitric acid can readily be produced.

The nitric acid produced from the product gases of the present invention may be recycled for acidulation of phosphate rock. In another embodiment, the nitrogen oxides and oxygen in the product gas stream may be added directly to the acidulate to form nitric acid in situ. The present invention, therefore, provides a convenient and efficient means for recovering and utilizing the nitrogen values in the calcium nitrate formed in the nitric acid acidulation of phosphate rock.

BRIEF DESCRIPTION OF THE DRAWING

The invention is hereinafter further described and illustrated with reference to the accompanying drawings in which.

DESCRIPTION OF PREFERRED EMBODIMENTS

Figure 1:
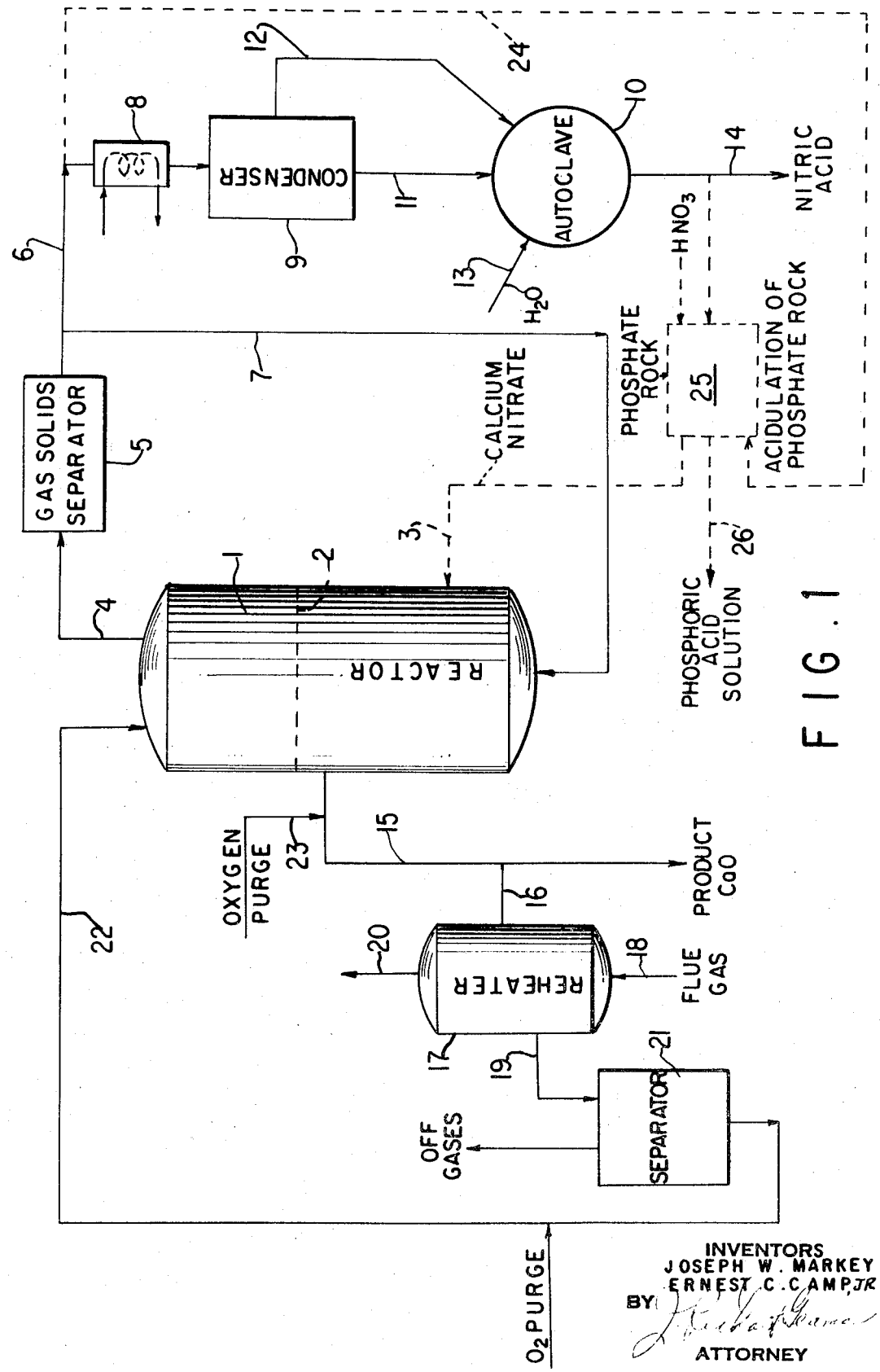
FIG. 1 is a diagrammatic arrangement of the apparatus that may be employed for carrying out an embodiment of the process herein described, the novel features of which are set forth in the appended claims.

In the digestion step it is necessary to employ from about 75 to 85% by weight concentrated nitric acid. Digesting with lower concentrations of nitric acid causes more gangue formation owing to less oxidation of organic impurities and also hinders the precipitation of the anhydrous calcium nitrate from the acidulate in the next step to an extent that adequate removal is impractical. Digesting with concentrations of nitric acid higher than about 85% proceeds very slowly, and results in losses of phosphoric acid on the order of at least 9%. For best results, 80 to 85% by weight, more especially about 80% by weight, concentrated nitric acid is employed.

In the digestion step, the temperature of the reaction mix should be from about 160 to 240° F. While temperatures not within this range can be employed, it has been found that below about 160° F., among other disadvantages, the digestion proceeds too slow for practical operation. Beyond about 240° F., no particular advantage in yield of phosphoric acid is obtained. In addition, the resulting corrosive qualities of the system require prohibitive preventive measures. It is particularly preferable to digest the phosphate rock at the equilibrium reaction temperature of the reacting mixture. The equilibrium temperature usually ranges from about 180° F. to 220° F. No heat control is necessary if digestion is carried on at the equilibrium reaction temperature. Further, more organic impurities are oxidized at equilibrium temperatures, than at lower temperatures, so that less foam is evolved during digestion.

Generally, unground or any size phosphate rock may be utilized for digestion, but it is preferred to crush the rock to a size such that it will pass through about a 16 Tyler Mesh screen. For best results, it is preferred to crush the rock to a size passing through about a 30 Tyler Mesh screen.

While the time of reaction is influenced somewhat by the rock size and temperature, reaction times of 1 to 2 hours are preferred when operationing according to this invention.

At least sufficient nitric acid to convert the phosphate rock to calcium nitrate and phosphoric acid is employed to digest the rock. The amount of nitric acid employed to digest the rock is based on the amount of calcium in the rock. It is preferred to add an excess, over the theoretical, of nitric acid, usually no more than 15% by weight, and preferably from about 10 to 15%, based on the calcium present, calculated as CaO. If more excess acid is added, no additional benefit is observed in terms of phosphate recovered by the process. When employing a 10 to 15% excess amount of nitric acid, this results in an acidulation ratio of from about 2.5 to 2.6 parts by weight nitric acid per part calcium calculated as CaO.

As previously indicated the calcium nitrate is precipitated from the acidulate obtained as described above in its anhydrous form. The precipitation of calcium nitrate in the anhydrous form is best, and preferably, accomplished by increasing the nitric acid content or concentration of the acidulate. It will be apparent that various means can be employed to increase the nitric acid content of the acidulate, included among which are the addition of a more concentrated solution of nitric acid to the acidulate or the formation of additional nitric acid in situ via the introduction of nitrogen oxides and oxygen into the acidulate.

In that embodiment wherein preformed and higher concentration nitric acid is added to the acidulate, the nitric acid should be at least 90% by weight concentrated. It is preferred, however, that the nitric acid be at least 95% and, more especially, at least 98% by weight concentrated (hereinafter referred to as essentially anhydrous nitric acid). Such preformed nitric acid is employed in amounts between about 0.5 to about 2.5 parts per part of phosphate rock initially acidulated.

In the alternative, but especially preferred, embodiment, the content of nitric acid in the acidulate is increased by introducing one or more nitrogen oxides (preferably the nitrogen oxides recycled and resulting from decomposition of calcium nitrate by-product) and oxygen, including air, into the acidulate at appropriate conditions to form nitric acid in situ with the water present in the acidulate. The water content is thus reduced in accordance with the equation: $NO_2 + 0.25O_2 + 0.5H_2O \rightarrow HNO_3$. In forming the nitric acid in situ, generally, a pressure of between about 100 p.s.i.g. and about 500 p.s.i.g. should be maintained for best results. Additionally, the amount of nitrogen oxides introduced into the acidulate in order to form the desired nitric acid in situ will depend somewhat upon the particular grade of phosphate rock employed and the specific concentration of nitric acid used to digest the rock. For convenience, the amount of nitrogen oxides can be based upon the quantity of rock acidulated. It has been found that generally from between about 0.75 and about 1.20 parts of nitrogen oxides, calculated as $N_2O_5$, per part of phosphate rock initially acidulated will be employed.

In another embodiment of this invention, a phosphoric acid solution may be produced in which most of the metal ions, particularly iron and aluminum, have been removed and recovered. As the water content is reduced and the system approaches an anhydrous condition, the metal ions begin to precipitate as metal phosphates. In order to recover these precipitates for their phosphate value, the bulk of the calcium nitrate can first be removed, and the water content of the filtrate can thereafter be reduced, e.g., as by reaction with nitrogen oxides and oxygen, so as to precipitate the metal phosphates. These phosphates, which can then be recovered in concentrated form, may be employed in the manufacture of triple superphosphate or can be ammoniated to produce a mixed fertilizer composition. A purified phosphoric acid solution, having a low content of metal impurities, can thus be obtained.

Regardless of what mode of operation is employed for increasing the nitric acid content in the acidulate, the temperature employed during the precipitation of the anhydrous calcium nitrate can be varied. It has been found, however, that best results are obtained when the equilibrium temperature of the precipitation mix is employed, e.g., from 160° F. to 190° F.

Further improvement is obtained when the water content of the calcium nitrate precipitation system is such that, after precipitation of the calcium nitrate, no more than 14% water is present in the supernatant solution regardless of whether the nitric acid content is increased by the addition of a more concentrated, preformed nitric acid solution or forming nitric acid in situ in the precipitation reaction mix.

Some advantage is achieved by recycling a slurry of anhydrous calcium nitrate obtained from a previous precipation step into the acidulate obtained from the digestion step in order to provide anhydrous calcium nitrate particles as nuclei for particle growth.

Generally speaking, the precipitation of the anhydrous calcium nitrate is essentially instantaneous. Upon completion of the precipitation, the solid and liquid phases can be separated by conventional means, e.g., decanting, filtration or, preferably, centrifugation. Such separation is readily achieved since the liquid phase is of a low viscosity and the anhydrous calcium nitrate crystals will settle rapidly.

While the precipitation reaction mix can be retained for a considerable period of time prior to separation, it is preferable to perform separation operations within a period of about one to two hours after precipitation.

Subsequent to separation, it is preferred that the anhydrous calcium nitrate cake be washed with between about 75 to 85, more especially about 80, percent by weight concentrated nitric acid, in order to recover any adsorbed phosphorus values. While varying amounts of such nitric acid wash solution can be employed, it is preferred that at least one part per part of anhydrous calcium nitrate be employed. It is likewise desirable to employ such nitric acid wash solution at a temperature of 70 to 100° F. in order to minimize the re-solution of calcium nitrate from the filtrate cake. The wash acid can, of course, be employed in the digestion step if desired.

The supernatant liquid remaining after removal of the precipitated anhydrous calcium nitrate can be employed as such in the usual applications of forming mixed fertilizers. For example, upon removal of nitric acid and/or water if desired, the supernatant liquid can be reacted with bases, such as ammonia or potassium hydroxide, to produce mixed fertilizers which have an exceptionally high water solubility and plant food analysis. On the other hand, the supernatant phosphoric acid solution can be subjected to purification techniques in order to recover essentially pure phosphoric acid.

In accordance with the present invention, the precipitated calcium nitrate is decomposed in a nitrogen oxide-containing atmosphere in order to minimize the proportion of inerts included in the resulting product gas stream. By also minimizing or at least restricting the amount of water in the system, a resulting product gas stream may be otained that is particularly well suited for the production of very concentrated nitric acid. As will hereinafter be set forth in further detail, a variety of techniques may be employed for contacting the calcium nitrate with the nitrogen oxide-containing atmosphere during decomposition.

In the practice of one embodiment of the present invention, the precipitated calcium nitrate is decomposed in a vertically oriented decomposition zone containing a bed of inert particulate inorganic material maintained in the fluidized state by the passage of an inert gas upwardly through the bed at a special velocity sufficient to maintain the bed in a fluidized state. The product gases obtained by the decomposition of the calcium nitrate are withdrawn from the decomposition zone from a point above the fluidized bed. The product gases comprise generally nitrogen oxides. Lime is also produced as a solid by-product of the decomposition reaction. These solids are also withdrawn from the decomposition zone separately from the product gases. The nitrogen values of the calcium nitrate being decomposed are, in this manner, recovered essentially in the form of nitric oxide and nitrogen dioxide.

The bed of solids employed in the present invention may comprise any suitable inert particulate inorganic material. Illustrative of the various inert solids that may be employed are silica, clay, calcium carbonate, calcium oxide, and mixtures thereof. Since solid calcium oxide is produced in the decomposition of the calcium nitrate, the desired quantity of solids may be maintained in the decomposition zone by continuously withdrawing a portion of the solids separately from the product gases. In another embodiment, a portion of the solids removed from the decomposition zone may, of course, be recycled back to the decomposition zone. This feature has particular advantages as will be pointed out hereinafter in further detail.

The bed of solids is maintained in a fluidized state by passing an inert gas upwardly through the decomposition zone at a spacial velocity sufficient to maintain the bed in a fluidized state. While the spacial velocity will depend upon the fineness and density of the inert solids employed, the velocity will generally range from about 0.5 to about 3.0 feet per second.

Any suitable inert gas may be employed as the fluidizing gas of the present invention. For example, air or oxygen can conveniently be employed. As discussed below, it is often desirable that the product gases contain a very low percentage of inert material, e.g., nitrogen, as a diluent. For this reason, it is often convenient to recycle a portion of the product gas stream comprising nitrogen oxides for further passage upwardly through the decomposition zone as the fluidizing gas. In another embodiment of the present invention, the fluidizing gas may comprise carbon dioxide. In this instance, the fluidizing gas is not inert but tends to react with the by-product lime so as to form calcium carbonate. Since this reaction is exothermic, the overall heat requirements for the decomposition of the calcium nitrate are correspondingly reduced. The by-product calcium carbonate can be removed from the bed and, if desired, a portion thereof may be recycled so as to maintain the desired quantity of solids in the decomposition zone.

It is within the scope of the present invention to inject the calcium nitrate into the decomposition zone in either solid or liquid form. When the product gases are to be employed for the production of very high concentration nitric acid, it is highly advantageous that the partial pressure of nitrogen oxides in the product gas stream be held as high as possible and that the introduction of water into the system be restricted to the extent possible. As previously indicated, the introduction of inerts such as nitrogen can be avoided by recycling a portion of the product gas stream as the fluidizing gas. The calcium nitrate may be fed to the decomposition zone as an anhydrous crystalline solid, as a melt of the anhydrous salt, or as a highly concentrated aqueous solution of the salt. When introduced as the anhydrous crystalline solid, the calcium nitrate may be employed in dry form or in wet form as following washing with a minimum amount of aqueous nitric acid. When the calcium nitrate is introduced as a highly concentrated aqueous solution, the solution may contain some nitric acid.

The calcium nitrate being decomposed should, of course, be heated to at least its decomposition temperature. The decomposition temperature of calcium nitrate is approximately 650° C. at atmospheric pressure. While higher temperatures may be employed in order to hasten the decomposition of the calcium nitrate, it has generally been found that the use of higher temperatures tends to cause some reversion of the nitrogen oxides in the product gas stream to nitrogen. When nitric acid is to be produced from the nitrogen values in the product gas stream, it is desirable that the nitrogen be recovered from the calcium nitrate decomposition operation in the form of nitrogen oxides. The use of temperatures increasingly higher than the decomposition temperature of the calcium nitrate will, for this reason, generally be discouraged. In addition, if the recovery of by-product calcium carbonate is desired in the embodiment in which the fluidizing gas contains carbon dioxide, the temperature should not exceed the decomposition temperature of the calcium carbonate, i.e., about 895° C. The decomposition zone will generally be maintained at a temperature within the range of from about 650° C. to about 675° C. The heat required to maintain the decomposition zone at the required temperature may be supplied in any convenient manner. For example, the solids added to the decomposition zone or the fluidizing gas may be heated to the necessary temperature for maintaining the reactor at decomposition temperature alternately, the reactor may be externally heated.

The product gas stream withdrawn from above the fluidized bed will generally comprise nitrogen oxides. At the operating temperature required to decompose calcium nitrate, the principal nitrogen-bearing gases obtained will be nitric dioxide. The recovery of the nitrogen values from the calcum nitrate in the form of thees nitrogen oxides renders the process readily adaptable to a cyclic operation in which nitric acid is employed for the acidulation of phosphate rock. By-product calcium nitrate is decomposed in accordance with the present invention to produce a product gas stream containing nitrogen oxides from which additional nitric acid may readily be obtained. As set forth below, the product gas stream may be used for producing nitric acid having a concentration in a range including the azeotrope of about 68% and may also be employed for the production of very high concentration acids, i.e., 98% or higher. For this purpose, an excess of oxygen over that stoichiometrically required is generally needed for the production of very highly concentrated nitric acid. This excess oxygen can, if desired, be obtained by the use of a fluidizing gas comprising oxygen. Alternately, an oxygen purge countercurrent to the solids withdrawal stream may be employed. In this manner, the nitrogen values that may be entrapped or otherwise carried over into the solids withdrawal stream may be recovered in the form of nitrogen oxides, thus serving also to eliminate nitrogen from the proudct gases, while likewise adding the excess oxygen that would, in any event, have to be added at some stage in order to produce a very concentrated nitric acid.

In the particular embodiment illustrated in FIG. 1, calcium nitrate is decomposed in a vertically oriented reactor 1 having bed 2. The material to be decomposed is introduced into reactor 1 through line 3, while line 4 is provided for the withdrawal of gases from the upper portion of reactor 1. The product gases pass through line 4 to gas-solids separator 5 and to exit line 6. A portion of the gas may be recycled to reactor 1 through line 7. The remaining product gases pass through line 6 and heat exchanger 8 to condensing unit 9. Liquids and gases pass from condensing unit 9 to autoclave 10 through lines 11 and 12, respectively. Water may be added to the autoclave through line 13, and nitric acid produced in the autoclave may be withdrawn through line 14.

Solids may be withdraw from reactor 1 through line 15 positioned below the interface between the fluidized bed and the gas in the upper portion of the reactor. Countercurrent oxygen purge line 23 is provided in order to purge solids withdrawn through line 15 of entrapped nitrogen gases. A portion of the solids withdrawn through line 15 may be passed through line 16 to fluo-solids regenerator 17 in which the solids are heated by combustion gases entering through line 18.

Solids may be withdraw from regenerator 17 through line 19 while gaseous material is taken off through line 20. After passing through gas-solids separator 12, the solids may be returned to reactor 1 through line 22.

In the operation of the illustrated embodiment, anhydrous calcium nitrate precipitated in the manner indicated above is fed into the fluidized bed decomposition zone of reactor 1 maintained at the decomposition temperature of calcium nitrate. A portion of the product gases recycled through line 7 is injected into the reactor at a sufficient spacial velocity to maintain the bed in a fluidized state. The by-product lime removed from the reactor through line 15 is heated in fluo-solids regenerator 17 and is recycled to the reactor through line 22. Sufficient solids are recycled to supply the heat necessary for decomposition under fluid bed conditions. Since the requirement for recycled solids is one of heat transfer rather than of avoiding stickiness, the amount of recycle employed in the present invention can be considerably less than in the prior art techniques referred to above. The temperature to which the recycle solids is raised in regenerator 17 is, of course, a function of the ratio of calcium nitrate feed to recycle solids at which it is desired to operate. Solids can also be recovered from the regenerator effluent and its heat content may be recovered in a conventional manner prior to discharge of the flue gas.

By purging the solids withdrawal stream with oxygen from line 23, any nitrogen values entrapped or otherwise carried over with the solids may be recovered in the form of nitrogen oxides. Thus, the product gas stream leaving reactor 1 will comprise essentially nitrogen oxides, i.e., nitric oxide and nitrogen dioxide, excess oxygen and a small amount of fines, principally calcium oxide. After passage through gas-solids separator 5, and withdrawal of the portion of the product gas employed for fluidization of bed 2, the product gas stream may be passed through heat exchanger 8 and condensing unit 9 in which, under moderate pressure, the stream may be refrigerated so as to remove essentially all of the nitrogen oxides as liquid nitrogen tetroxide. Gaseous oxygen remains in the gas stream. These streams may then be pumped separately through lines 11 and 12 and compressed into an autoclave 10 into which an appropriate amount of water is added through line 13. Nitric acid is produced in autoclave 10 in accordance with known procedures to produce acid having a concentration of 98% or higher. While this autoclave process must be carried out with an excess of oxygen as well known in the art, the autoclave may be operated at considerably reduced pressure in the absence of diluent such as nitrogen. The use of recycled product gas as the fluidizing gas and the inclusion of the recited oxygen purge are highly advantageous features of this embodiment of the present invention. It is within the scope of the present invention to employ the very concentrated nitric acid thus produced in the nitric acid acidulation operation. In one embodiment, the acid is employed at a concentration of about 75% to about 85% by weight, for the digestion of additional quantities of phosphate rock in reaction vessel 25. Alternately, the very concentrated nitric acid may be employed, preferably at a concentration above 90% by weight, or more preferably above 95% by weight, for the precipitation of anhydrous calcium nitrate from the acidulate formed in reaction vessel 25. Product phosphoric acid solution is withdrawn through line 26, whereas separated anhydrous calcium nitrate is recycled to reactor 1 through line 3.

As previously indicated, the nitrogen oxides and oxygen resulting from the decomposition of calcium nitrate may be introduced directly into the acidulate formed by the reaction of phosphate rock with nitric acid having a concentration of about 75% to 85% by weight. Nitric acid is thereby formed in situ, thus reducing the water content of the acidulate generally to below about 14% by weight. In this embodiment, the nitrogen oxides are passed from exit line 6 to line 24 for introduction into the acidulation mixture in reaction vessel 25. Phosphoric acid solution is withdrawn from reaction vessel 25 as product through line 26. The separated anhydrous calcium nitrate is recycle to reactor 1 through line 3.

It will be readily appreciated that the product gases obtained from reactor 1 may be subjected to conventional absorption to produce nitric acid solutions having strengths reaching above the azeotrope of about 68%. In this embodiment, the presence of nitrogen and steam in the product gas stream removed from the reactor is of less significance than in the production of the very high concentration acids as indicated above.

The heat required for decomposition of the calcium nitrate can be furnished by heating the portion of the product gas stream to be recycled to the reactor. However, the low specific heat and specific gravity of the gas would necessitate a relatively high gas recycle to furnish the required amount of heat. In the embodiment illustrated in the drawing, therefore, the heat is supplied by recycling a portion of the lime withdrawn from the reactor. While a fluidized bed regenerator unit 17 was indicated, it is, of course, within the scope of the invention to provide any other convenient means for heating the recycle lime.

It has heretofore been found that, upon decomposition of calcium nitrate, extremely finely divided calcium oxide particles are formed during the evolution of the gaseous products. These fine particles must necessarily be separated from the decomposition gases to be employed for the manufacture of nitric acid. This separation, however, constitutes a difficult operation that adversely affects the overall process of decomposing calcium nitrate for the ultimate recovery of the nitrogen values as nitric acid.

In the fluidized bed process of the present invention, on the other hand, the particles of lime tend to grow during the calcium nitrate decomposition due to agglomeration and deposition of new lime on the surface of the existing particles. For example, calcium nitrate samples were decomposed in a fluid bed reactor maintained at decomposition temperature in accordance with the present invention. The particle size distribution of the lime during the runs is set forth in Table I as follows:

TABLE I

| Time, min. | Particle size distribution, mesh— | | | | | Gas velocity, ft./sec. |
|---|---|---|---|---|---|---|
| | +20, percent | +40, percent | +60, percent | +80, percent | −80, percent | |
| 0 | 0 | 0 | 50 | 100 | | |
| 11.1 | 0.9 | 1.7 | 56.8 | 100 | | 1.76 |
| 17.0 | 4.5 | 12.1 | 71.2 | 100 | | 1.76 |
| 28.4 | 23.5 | 40.9 | 87.1 | 100 | | 3.17 |
| 0 | 5 | 32.5 | 67.5 | 95.0 | 5.0 | |
| 5 | 12.6 | 52.8 | 86.6 | 99.2 | 0.8 | 1.76 |
| 10 | 15.6 | 63.8 | 91.5 | 99.3 | 0.7 | 1.76 |
| 15 | 18.7 | 72.0 | 95.3 | 100.0 | 0.0 | 2.64 |
| 20 | 19.2 | 73.4 | 97.2 | 100.0 | 0.0 | 2.64 |

As demonstrated by the results shown in Table I, a definite tendency for growth of the lime particles in the fluidized bed occurs during calcium nitrate decomposition. This growth and the resultant withdrawal of coarser particles from the decomposition zone tends to minimize the carry-over of fines into the product gas stream. This feature of the present invention is of great significance in view of the difficulty with which such fines are removed from the product gas stream.

As indicated above, one embodiment of the present invention calls for the heating of a portion of the lime withdrawn from the decomposition zone followed by decycling to the bed in the reactor. If the recycled lime were to continue to grow in particle size, the particles would eventually become too large for satisfactory fluidization. When the particles of lime are reheated, however, it has been found that a breakdown in particle size occurs.

As a result, the reheated lime has a particle size more appropriate for fluidization than the coarser particles as withdrawn from the decomposition zone. The disintegration of calcium oxide particles on heating is shown in Table II, which indicates the effect of heating on the particle size distribution of the calcum oxide.

TABLE II

| Temp., ° F.: | Size distribution mesh— | | | | |
|---|---|---|---|---|---|
| | +20, percent | +40, percent | +60, percent | +80, percent | −80, percent |
| 25 | 0.0 | 50.0 | 100.0 | | |
| 1,290 | 0.0 | 38.3 | 56.7 | 95.8 | 4.2 |

It can readily be seen from the results shown in Table II that heating causes a breakdown in particle size of the lime particles so that a finer particle size distribution is obtained. While fines may thus be produced in the regenerating unit, the production of fines at this point is of less consequence than the production of fines in the reactor. The flue gas from the regenerating unit, together with very fine material contained therein, will ordinarily be discarded after heat recovery. In order to avoid air polution, the gas may be passed through a water scrubber. The use of such a scrubber can not be tolerated, however, with respect to the product gas stream from which very highly concentrated nitric acid is to be produced.

In the decomposition of particular samples of calcium nitrate under static conditions, the bulk density of the lime produced was about 30 pounds per cubic foot. Lime produced in the fluidized bed decomposition of such calcium nitrate, however, had a density of about 68 to 70 pounds per cubic foot. The density distribution of calcium oxide from the decomposition of calcium nitrate in accordance with the present invention was as set forth in Table III below.

TABLE III.—BULK DENSITY OF CALCIUM OXIDE

| Particle size range, mesh | | Bulk density, lbs./ft.³ |
|---|---|---|
| (−) | (+) | |
| | 20 | 68.0 |
| 20 | 40 | 74.2 |
| 40 | 60 | 77.8 |
| 60 | 80 | 62.5 |
| 70 | | 51.8 |

While the degree of agglomeration and particle growth will depend upon such factors as initial particle size distribution and the particular decomposition temperature, the results in Table III further demonstrate that a larger, more stable product is obtained in the fluidized bed decomposition process of the present invention. The increase in bulk density for particles of relatively finer particle size is indicative of the agglomeration and formation of higher and larger particles that serves to minimize the production and carry-over of fines in the product gas stream as discussed above. In the regeneration zone, on the other hand, the lime tends to disintegrate under heating. While the degree of disintegration will depend upon such factors as the initial particle size distribution and the desired reheat temperature, the bulk density of the recycled lime, following heating in the regeneration zone, is commonly on the order of about 50 to 55 pounds per cubic foot.

The nitrogen oxide-containing atmosphere employed herein can, of course, be obtained in any convenient manner. Ammonia gas may be burned, for example, to form nitrogen oxides, e.g., nitric oxide and nitrogen dioxide, from which the water of reaction may be condensed and trapped away in a conventional manner. The nitrogen oxides may thereafter be injected into the decomposition zone so as to establish the nitric oxide-containing atmosphere therein.

While the present invention has been described herein with respect to nitrogen oxide-containing atmospheres in which the quantity of inerts and water has been minimized, it is also within the scope of the invention to employ a nitrogen oxide-containing atmosphere in which the quantity of inerts and water is not minimized. For example, ammonia gas may be mixed with air, e.g., 11 percent $NH_3$, passed through a fine wire gauze of activated platinum raised to glowing heat, and combined to form nitric oxide, i.e., (NO), and water. At least a portion of the nitric oxide will convert to nitrogen dioxide. The mixed nitrogen oxides, together with the water of reaction, may be injected into the decomposition zone to provide a nitrogen oxide-containing atmosphere during decomposition of calcium nitrate.

As indicated above, the precipitated calcium nitrate may be fed to the decomposition zone as an anhydrous crystalline salt, as a melt of the anhydrous salt, or as a highly concentrated aqueous solution of the salt in those instances in which it is desired to maintained the ratio of water to nitrogen oxides as low as possible. In addition to the fluidized bed decomposition zone described above, various other techniques may be employed for contacting the calcium nitrate and the nitrogen oxide-containing atmosphere during decomposition. Thus, a rotary kiln containing a bed of residual lime may be employed. The bed may be maintained by recycling by-product lime formed during the thermal decomposition of the calcium nitrate. Any other conventional type contacting chamber in which the calcium nitrate may be exposed to decomposition temperature in the presence of a nitrogen oxide-containing atmosphere may be employed in the practice of the present invention. In one embodiment, a nitrogen oxide-containing gas may be fed countercurrently to the calcium nitrate feed so as to assure the thorough contacting of the calcium nitrate with the gas, which may be heated to supply all or a portion of the heat necessary for decomposition. It is also within the scope of the present invention to include carbon dioxide in the nitrogen oxide-containing atmosphere. Since the carbon dioxide tends to react with the by-product lime in an exothermic reaction, the heat requirements for the calcium nitrate decomposition are thus reduced. While the amount of carbon dioxide is not critical, the nitrogen oxide-containing atmosphere may conveniently contain 20% or more by weight $CO_2$, although lesser quantities may also be employed.

In another embodiment of the present invention, the calcium nitrate may be injected into the decomposition zone in the form of a mist or spray of atomized droplets. Complete external melting of the calcium nitrate solids, or any hydrates thereof, can be accomplished continuously with any of the standard, commercially available melting furnaces commonly employed for similar purposes. Gas or oil fired units and electric units are commercially available. Injecting the calcium nitrate melt into the decomposition zone can be accomplished in a variety of ways. The melt can, for example, be put under pressure and passed through a venturi ejector in which it is mixed with the heat-carrying nitrogen oxide-containing atmosphere so as to form a mist that is injected into the decomposition zone. Likewise, hot nitrogen oxide-containing gas may be compressed and passed through the nozzle of a venturi type ejector so as to pull the melt from the melting unit by the vacuum induced in the suction end of the venturi, thus mixing the nitrogen oxide-containing gas and the calcium nitrate melt to produce a spray mist that is injected into the decomposition zone. In another embodiment, the melt can be injected directly as atomized droplets into the decomposition zone in which it is mixed with the hot, nitrogen oxide-containing atmosphere to affect decomposition.

Figure 2:
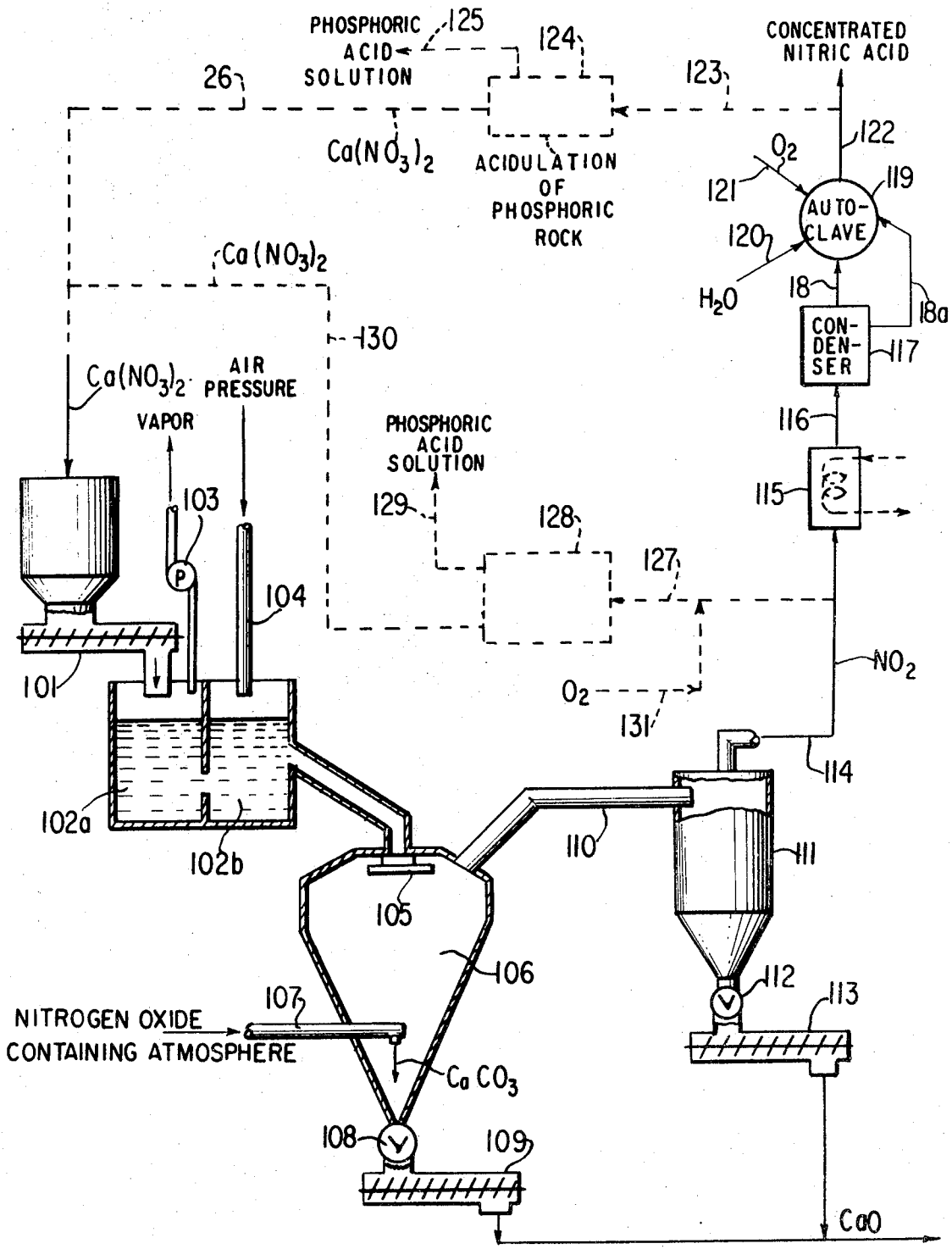
FIG. 2 is a diagrammatic illustration of the apparatus that may be employed for carrying out an alternate embodiment of the process herein described.

In FIG. 2, calcium nitrate solids are decomposed so as to form nitrogen oxides that can be converted to nitric acid. The calcium nitrate solids being decomposed may be those formed in the nitric acid acidulation of phosphate rock to form wet process phosphoric acid. This acidulation step and the subsequent conventional separation of calcium nitrate from the reaction mixture are not shown in the drawing. The separated calcium nitrate solids are fed to screw conveyor 101 that transports them to the melting section of an electric melter 102 having a separate melting section 102a and holding section 102b. Exhaust fan 103 is provided to remove any vapors formed during the melting from melting section 102a. Pressure exerted by means of compressed air line 104 forces the calcium nitrate melt from holding section 102b to a standard disk atomizer 105 positioned at the upper end of decomposition chamber 106.

A hot nitrogen oxide-containing gas obtained, for example, by the burning of ammonia is introduced into the lower portion of decomposition chamber 106 by means of conduit 107. Countercurrent flow of the calcium nitrate melt and the nitrogen oxide-containing gas is thereby achieved in decomposition chamber 106. A portion of the by-product lime collects in the bottom of decomposition chamber 106 and is discharged through air lock valve 108 onto screw conveyor 109, which removes it to storage and ultimate use as a by-product of the acidulation process. The remainder of the lime formed in decomposition chamber 106 is removed as fines in the nitrogen oxide gas stream passing out of decomposition chamber 106 through conduit 110. This product gas stream passes through dust collector 111 in which the fines are removed therefrom and collected. The lime thus removed from the product gas stream is passed through air lock valve 112 onto screw conveyor 113 that discharges the collected lime for storage with the lime recovered from the bottom of decomposition chamber 106.

After leaving dust collector cyclone 111, in which a large portion of the fines are removed therefrom, the product nitrogen oxide gas stream may be passed through conventional electrostatic Cottrell precipitators or a conventional bag house, not shown, for removal of additional fines that may still be present in the gas stream. The gases may then be passed, if desired, to a conventional nitric acid manufacturing unit, not shown, in which the nitrogen oxides are absorbed in water to form nitric acid of from about 52% to about 68% by weight concentration. Alternately, the nitrogen oxide product gas stream may be passed through line 114, heat exchanger 115 and line 116 to condensing unit 117. In this unit, the product gas stream may be refrigerated, under moderate pressure, so as to remove essentially all of the nitrogen oxides as liquid nitrogen tetroxide. Gaseous oxygen remains in the gas stream. These streams may then be pumped separately through lines 118 and 118a and compressed in autoclave 119 in accordance with known procedures to produce and having a very high concentration, as, for example, 98% by weight or higher. While this autoclave process must be carried out with an excess of oxygen, as well known in the art, the autoclave may be operated at considerably reduced pressure in the absence of a diluent such as nitrogen. If additional oxygen is required, it may be introduced into the autoclave with the product gas stream, i.e., through line 118a, or through line 121. Water may be added to the autoclave through line 120.

It will be appreciated that the concentrated nitric acid withdrawn from the autoclave through line 122 may be passed through line 123 to the acidulation unit 124. The concentrated acid thus formed from the nitrogen oxide gases may be employed, in acidulation unit 124, at a concentration of about 75% to about 85% by weight, for the digestion of phosphate rock. Alternately, this concentrated nitric acid may be employed, preferably, at a concentration above 90% by weight, for the precipitation of anhydrous calcium nitrate from the acidulate. The product phosphoric and solution is withdrawn through line 125, whereas the precipitated calcium nitrate may be passed through line 126 to the calcium nitrate decomposition zone.

As previously indicated, the nitrogen oxides and oxygen resulting from the decomposition of calcium nitrate may be introduced directly into the acidulate formed by the reaction of phosphate rock with nitric acid having a concentration of about 75% to 85% by weight. Nitric acid is thereby formed in situ, thus reducing the water content of the acidulate generally to below about 14% by weight. In this embodiment, the nitrogen oxides and oxygen are passed through lines 114 and 127 directly into the acidulation mixture in reaction unit 128. Additional oxygen may be added, if desired, through line 131. Phosphoric acid solution is withdrawn from reaction unit 128 as product through line 129. The separated anhydrous calcium nitrate is recycled to the decomposition operation through line 130.

The following examples are given to further illustrate the nature of the invention and are not limitative of scope.

EXAMPLE I

In order to determine the effect of varying the concentration of nitric acid employed to digest phosphate rock, said change being reflected in the amount of phosphate recovered, as compared to the theoretical amount present in phosphate rock, phosphate rock of about 30% $P_2O_5$ [corresponding to about 66% $Ca_3(PO_4)_2$], and 47% by weight calcium measured as CaO was digested after being crushed to a particle size passing through a 30 Tyler Mesh screen. About 2.74 parts nitric acid per part calcium in the rock, calculated on the basis of CaO, was used to digest the rock. It will be appreciated that the nitric acid employed can be formed from the decomposition of calcium nitrate as indicated above.

After the phosphate rock had been digested for an hour, the calcium nitrate was precipitated in its anhydrous form from the liquid acidulate by adding 2 parts of essentially anhydrous nitric acid (97.2% $HNO_3$, 2% $NO_2$, 0.6% $H_2O$) per part phosphate rock initially acidulated. The precipitate was separated from the liquid solution by centrifugation and the resulting phosphoric acid solution was analyzed for phosphoric acid content, as $P_2O_5$. The following table illustrates the results obtained.

ACIDULATION OF PHOSPHATE ROCK WITH NITRIC ACID

| Concentration of nitric acid employed for digestion | Temperature during digestion, °F. | $P_2O_5$ removed based on theoretical $P_2O_5$ in rock, percent |
|---|---|---|
| 75 | 240 | 97 |
| 80 | 240 | 97 |
| 85 | 240 | 86 |

The above and other data illustrate that about 80% concentrated nitric acid will produce the highest yields of phosphoric acid.

EXAMPLE II

To demonstrate the effects of temperature, phosphate rock was acidulated, anhydrous calcium nitrate precipitated, and phosphate recovered, employing the procedure essentially as described in Example I with exception that 80% concentrated nitric acid was employed for digestion of the rock at the indicated temperature. Also the digestion was performed for about 2 hours. The following table shows the results obtained in recovery of phosphate material at varying temperatures.

| Temperature of acidulate in °F. | $P_2O_5$ recovered based on theoretical $P_2O_5$ in rock, percent |
|---|---|
| 160 | 97 |
| 180 | 95 |
| 210 | 96 |
| 240 | 97 |

EXAMPLE III

In order to illustrate the effects of rock size on the process, 80% nitric acid was employed to digest phosphate rock according to the procedure of Example I. The temperature during digestion was 240° F. and 160° F.

EFFECT OF ROCK SIZE

| Particles passing through Tyler mesh of— | Percent recovered based on theoretical P₂O₅ rock at 240° F. | Percent recovered based on theoretical P₂O₅ in rock at 160° F |
|---|---|---|
| Unground | | 38.6 |
| 6 | 88.9 | 62.8 |
| 10 | 84.4 | 67.0 |
| 16 | 93.6 | 77.8 |
| 20 | 93.9 | 94.0 |
| 30 | 95.5 | 96.6 |
| 60 | | 97.2 |

From the results it is seen that crushing rock to a size passing through 30 Tyler Mesh screen produces a uniquely high recovery of phosphate value.

EXAMPLE IV

In order to further demonstrate the effectiveness of this process, four batch experiments were performed. In each experiment, one hundred parts of the phosphate rock employed in Example I were digested with 80 weight percent concentrated nitric acid at a rate of 2.70 parts $HNO_3$ per part calcium calculated as CaO. The 80% nitric acid adds about 33 parts of free water to the system. Otherwise the procedure of Example I was followed essentially as described.

The following table illustrates the relationship of anhydrous calcium nitrate removed from solution to the weight percent of free water in solution after precipitation.

In each experiment, increasing amounts of the anhydrous nitric acid were added to the acidulate to precipitate the anhydrous calcium nitrate.

| | Experiments | | | |
|---|---|---|---|---|
| | 1 | 2 | 3 | 4 |
| Parts of $HNO_3$ added per part $Ca(NO_3)_2$ | 0.38 | 0.77 | 1.15 | 1.54 |
| Parts of nitric acid added | 52.5 | 105.0 | 157.5 | 210.0 |
| Parts of acidulate before addition of nitric acid | 261.0 | 261.0 | 261.0 | 261.0 |
| Total parts | 313.5 | 366.0 | 418.5 | 471.0 |
| Parts of anhydrous calcium nitrate precipitated | 104.6 | 123.9 | 129.4 | 135.6 |
| Parts of solution after precipitation of nitric acid | 208.9 | 241.2 | 289.1 | 335.4 |
| Percentage of free water in supernatant solution, percent | 15.9 | 13.7 | 11.5 | 9.9 |
| Percentage of original calcum removed from solution, percent | 76 | 90 | 94 | 98.5 |

The results of this experiment demonstrate that in precipitating anhydrous calcium nitrate from a phosphate rock acidulate, by increasing the quantity of nitric acid in the system, sufficient nitric acid must be present in the acidulate to reduce the percentage of free water in solution to less than about 14 weight percent and preferably below 10 weight percent. When such calcium removal is achieved, a phosphoric acid solution (or phosphatic fertilizer concentrate) is obtained which can be converted to an essentially completely water soluble fertilizer, e.g. by ammoniation. The calcium, (as (CaO)) to phosphate $P_2O_5$ ratio in the system wherein 98.5% CaO has been removed, is about 1 to 17. The supernatant solution is essentially concentrated nitric and phosphoric acids. On evaporation of nitric acid, essentially pure phosphoric acid is produced.

EXAMPLE V

To demonstrate the precipitation of anhydrous calcium nitrate by forming nitric acid in situ, a 10% excess of 80% by weight nitric acid was employed to digest the phosphate rock of Example I. One hundred parts of the resulting acidulate, which contained 13.02% phosphoric acid (as $P_2O_5$) and 19.49% calcium nitrate (as CaO), were sealed in an autoclave. The autoclave temperature was adjusted to about 160° F. Next, 39 parts of nitrogen dioxide as from the decomposition of calcium nitrate in the fluid bed operation disclosed herein, were added and thereafter oxygen gas was introduced to furnish a pressure of 100 pounds per square inch gauge. Additional oxygen was added as needed to maintain this pressure.

The precipitation reaction was complete in 15 minutes and oxygen pressure was maintained for a further 15 minutes, though no pressure drop was observed which would indicate further reaction. After depressuring the system and filtering the anhydrous calcium nitrate cake, the liquid phase showed, on analysis, 16.98% phosphoric acid (as $P_2O_5$) and only 1.18% calcium nitrate (as CaO), or a ratio of 14 to 1. The low ratio of calcium in the phosphatic concentrate makes it especially suitable for processing by neutralization to a highly water soluble mixed fertilizer.

EXAMPLE VI

Employing the procedure of Example V, 100 parts of nitric acid acidulate containing 13% ($P_2O_5$) and 17.58% (as CaO) were reacted with 129 parts of nitrogen dioxide and oxygen. The filtrate obtained analyzed 9.61% ($P_2O_5$) and 0.4% (CaO) a ratio of 24 to 1. The production of $P_2O_5$ was 98.8% of theoretical.

The higher degree (over 97% calcium removed) of purity of the filtrate, allows further processing of the solution to a mixed fertilizer of higher water solubility.

The above examples illustrate various specific embodiments of the process. When the above examples are repeated employing the conditions, proportions and other variations discussed herein, similar results are obtained. It is to be understood that modifications can be made. For example, the anhydrous calcium nitrate can be precipitated from the acidulate employing a combination of both pre-formed and in situ-formed nitric acid. Still further, the wash solution resulting from washing the filtered anhydrous calcium nitrate can be employed in the process. For example, at the designated concentrations, it, along with make-up acid, can be used as digestion acid. The wash solution can also be employed in the precipitation step either by further concentrating to a higher nitric acid content or by combining with make-up nitric acid. It will also be evident that the wash solution can be reacted with nitrogen oxides and oxygen to produce additional nitric acid in situ.

The anhydrous calcium nitrate by-product can be used for various known purposes or it can be decomposed at elevated temperatures, producing nitrogen oxides and oxygen. The nitrogen oxides and oxygen can then be reacted with water to form nitric acid, either separately or in situ; for example, in the precipitation reaction mix. Still further, any nitric acid that is recovered from the phosphoric acid solution or elsewhere in the processing can, of course, be used in either forming the digestion acid or the precipitation acid. It will also be evident that the process of this invention can be conducted either by batch or continuous techniques employing single or multiple reactors for the digestion step and/or the precipitation step.

The phosphoric acid solution resulting from separation of the anhydrous calcium nitrate can be employed for many uses. It is particularly useful for neutralization reactions with bases, especially ammonia and phosphate rock, to produce fertilizer mixes. Nitric acid contained in the phosphoric acid solution can be removed to any desired extent in order to adjust the final composition of the fertilizer mix. In all cases, however, the resulting fertilizer mix is at least 90 percent soluble in water and most generally at least 95 percent soluble in water. Numerous fertilizer mixes have been prepared employing the phosphoric acid solution obtained by the present process. By way of example, fertilizer mixes resulting from ammoniation typically are formed with at least 2:1 and more generally 3:1 phosphoric acid anhydride, i.e., $P_2O_5$, to nitrogen ratios having the aforementioned water solubility characteristics.

Still further, mixed fertilizers can be obtained readily from the phosphoric acid solution resulting from practicing the process of this invention without removal of the nitric acid by reacting the phosphoric acid solution directly with metal salts such as alkali metal halides and, preferably, potassium chloride. Usually the alkali metal halide is employed in an amount of at least 2 moles per mole of phosphoric acid contained in the phosphoric acid solution. During the reaction of the alkali halide for example, potassium chloride, with the phosphoric acid solution, chlorine and nitrogen oxides are produced which can be readily separated and reused as discussed above. Generally, any unreacted nitric acid is removed from the alkali halide and phosphoric acid solution reaction mixture and the residue is preferably heated at a temperature of about 740° C. for about thirty minutes. Again the resulting mixed fertilizer is essentially completely soluble in water and has an exceptionally high plant food analysis. A particular feature among others, in employing the phosphoric acid solution produced by this invention for reaction with the alkali halide as described herein, is that highly toxic and corrosive nitrosyl halide normally produced by prior art techniques are minimized.

By means of the present invention, essentially all of the nitrogen values contained in the calcium nitrate undergoing decomposition may be recovered and converted into nitric acid. Thus, the present invention provides a highly desirable overall process for producing phosphatic fertilizers and wet process phosphoric acid by the nitric acid acidulation of phosphate rock. In view of the well known and critical need in the industry for alternatives to the ever increasing need for sulfur, the present invention is of the greatest importance to producers of wet process phosphoric acid, phosphatic fertilizers and related agricultural and other products.

While the present invention has been described herein with reference to particular embodiments thereof, it will be readily appreciated by those skilled in the art that various changes and modifications can be made therein without departing from the scope of the present invention as hereinafter set forth in the appended claims.

Therefore, we claim:
1. A process for treating phosphate rock with nitric acid to produce a phosphoric acid solution which comprises:
   (a) digesting phosphate rock with at least sufficient 75% to 85% by weight concentrated nitric acid to convert the phosphate rock to an acidulate comprising calcium nitrate and phosphoric acid,
   (b) thereafter raising the nitric acid concentration of said acidulate to precipitate anhydrous calcium nitrate therefrom, and recovering the supernatant phosphoric acid solution,
   (c) decomposing said calcium nitrate and recovering the nitrogen oxide decomposition gases, and
   (d) recycling said nitrogen oxide decomposition gases for production of additional nitric acid for treatment of phosphate rock.

2. A process according to claim 1 in which the nitric acid concentration of the acidulate is raised until the solution contains less than about 14% by weight of water.

3. A process according to claim 1 in which the nitric acid concentration of the acidulate is raised by adding at least 90% by weight concentrated nitric acid.

4. A process according to claim 1 in which the nitric acid concentration of the acidulate is raised by the introduction therein of a nitrogen oxide and oxygen.

5. A process according to claim 1 in which the calcium nitrate is decomposed in a vertically oriented fluidized bed decomposition zone.

6. A process according to claim 1 in which the calcium nitrate is decomposed in the presence of a nitrogen oxide containing atmosphere.

7. A process according to claim 1 in which the calcium nitrate is decomposed in the presence of a nitrogen oxide.

8. A process according to claim 1 in which the nitrogen oxide decomposition gases are absorbed in water to form nitric acid.

9. A process according to claim 1 in which the nitrogen oxide decomposition gases are recycled and introduced, together with excess oxygen to the digestion solution to form nitric acid therein.

10. A process according to claim 1 in which the nitrogen oxide decomposition gases are recycled and introduced, together with excess oxygen to the acidulate solution to raise the nitric acid concentration thereof and precipitate calcium nitrate.

11. A process according to claim 1 in which the nitrogen oxide decomposition gases are condensed to form liquid nitrogen tetroxide, which is contacted, together with oxygen, with water to form concentrated nitric acid.

References Cited

UNITED STATES PATENTS

| | | | |
|---|---|---|---|
| 1,903,636 | 4/1933 | Smith | 23—102 |
| 2,609,271 | 9/1952 | Plusje | 23—102 |
| 2,713,534 | 7/1955 | Constant | 71—39X |
| 2,757,072 | 7/1956 | Kapp | 23—158 |
| 2,985,527 | 5/1961 | Nossen | 71—39 |

FOREIGN PATENTS

| | | | |
|---|---|---|---|
| 22,018 | 1891 | Great Britain | 23—158 |

OSCAR R. VERTIZ, Primary Examiner

G. O. PETERS, Assistant Examiner

U.S. Cl. X.R.

23—102; 71—39

PO-1050
(5/69)

UNITED STATES PATENT OFFICE
CERTIFICATE OF CORRECTION

Patent No. 3,560,149      Dated Feb. 2, 1971

Inventor(s) Joseph W. Markey and Ernest C. Camp, Jr.

It is certified that error appears in the above-identified patent and that said Letters Patent are hereby corrected as shown below:

Column 20, lines 21-22, read "nitrate is decomposed in the presence of a nitrogen oxide."; should read -- nitrate is decomposed in the presence of carbon dioxide. -- .

Signed and sealed this 7th day of December 1971.

(SEAL)
Attest:

EDWARD M. FLETCHER, JR.　　　ROBERT GOTTSCHALK
Attesting Officer　　　　　　　Acting Commissioner of Patents